(12) United States Patent
Solomon

(10) Patent No.: US 8,400,531 B2
(45) Date of Patent: Mar. 19, 2013

(54) DIGITAL IMAGE FILTRATION METHODS

(76) Inventor: Neal Solomon, Oakland, CA (US)

( * ) Notice: Subject to any disclaimer, the term of this patent is extended or adjusted under 35 U.S.C. 154(b) by 0 days.

(21) Appl. No.: 12/932,856

(22) Filed: Mar. 8, 2011

(65) Prior Publication Data

US 2012/0229673 A1 Sep. 13, 2012

(51) Int. Cl.
*H04N 5/76* (2006.01)
*H04N 5/217* (2006.01)

(52) U.S. Cl. .................................. 348/231.99; 348/241

(58) Field of Classification Search ............... 348/222.1, 348/241, 252, 234, 235, 231.99, 207.1, 207.11; 345/2.3, 102.7; 382/167, 274, 293, 162, 382/163
See application file for complete search history.

(56) References Cited

U.S. PATENT DOCUMENTS

2008/0174678 A1* 7/2008 Solomon .................. 348/231.99

\* cited by examiner

*Primary Examiner* — Roberto Velez
*Assistant Examiner* — Stephen Coleman

(57) ABSTRACT

A multi-functional digital imaging system is described that controls and manages digital image filtration processes. The camera CPU and DSP are used to filter digital sensor files using algorithms to correct optical and digital aberrations.

20 Claims, 14 Drawing Sheets

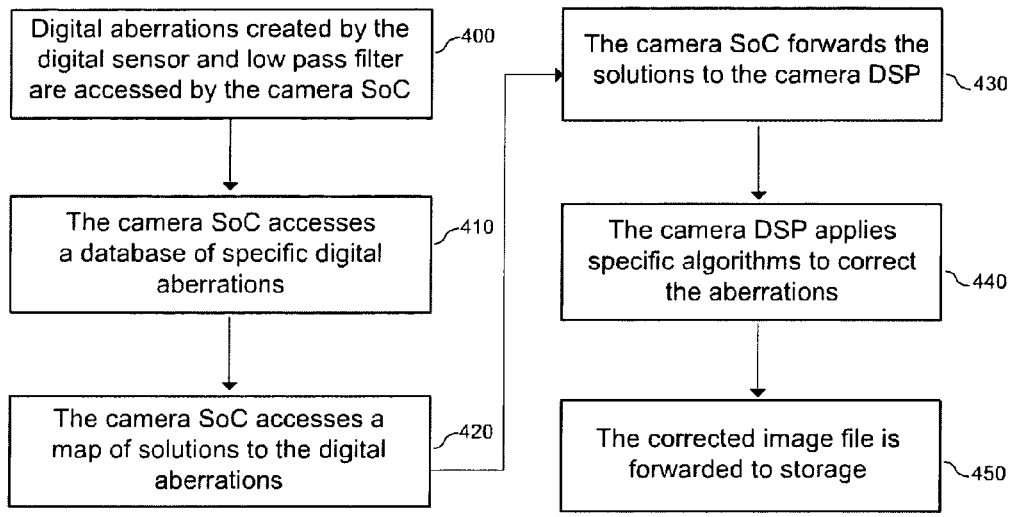
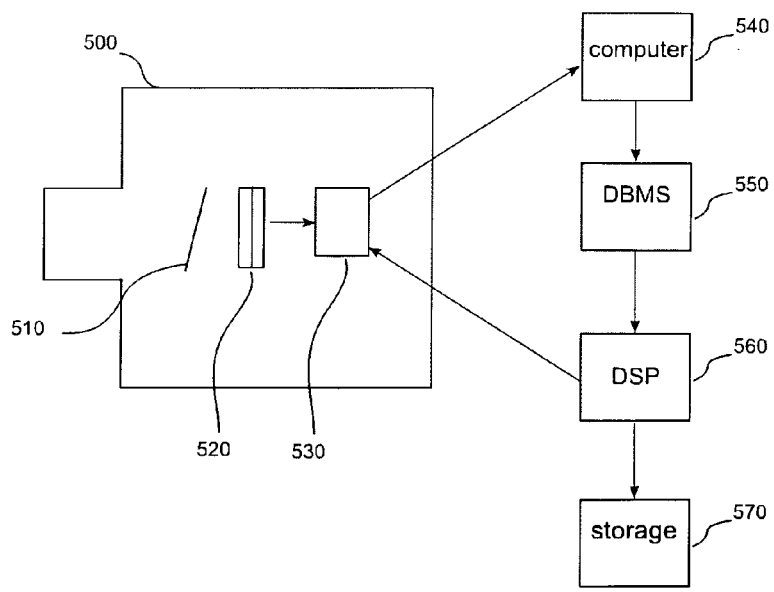

Library

| A1 | Optical aberration | 1 | Phase 1 | ~1400 |
| A2 | Optical aberration | 2 | Phase 2 | ~1410 |
| A3 | Optical aberration | X | Phase 3+ | ~1420 |
| A4 | Digital aberration | 1 | Phase 4 | ~1430 |
| A5 | Digital aberration | 2 | Phase 5 | ~1440 |
| A6 | Digital aberration | X | Phase 6+ | ~1450 |

Library

DIGITAL IMAGE FILTRATION METHODS

CROSS-REFERENCES TO RELATED APPLICATIONS

The present application claims the benefit of priority under 35 U.S.C. §119 from U.S. Provisional Patent Application Ser. No. 61/338,771, filed Mar. 9, 2010, the disclosure of which is hereby incorporated by reference in their entirety for all purposes.

FIELD OF THE INVENTION

The invention pertains to optical image capture, digital image sensors, digital image signal processing, digital image filtration, manipulation and camera circuitry, digital video image signal processing, compression, filtration and manipulation, digital image file storage, and digital image and digital video image display circuitry and display management. The invention also involves network computing functions involving digital imaging and digital video files and database management involving digital imaging and digital video files.

BACKGROUND OF THE INVENTION

A digital camera consists of an optical component, a digital sensor component, image processing circuitry, camera system circuitry, and a file storage component. Each of these component types have undergone, and continue to undergo, evolution. A problem that emerges is the issue of obsolescence. As each component in a camera system is updated, the overall system becomes obsolete, much like a computer. This constant updating and obsolescence forces users to upgrade to newer camera technology every few years.

The history of digital imaging is a story of filtration solutions to optical and digital aberrations. To solve these image aberrations, engineers have used integrated circuits and software techniques to address specific problems. For example, aliasing and moireé effects have been solved by applying anti-aliasing and low-pass filters that contain complex software algorithms. Further, the problem of optical aberrations, such as vignetting, pin cushioning and chromatic aberrations, are filtered by applying digital solutions. The need to improve these solutions forces the camera circuitry to be upgraded periodically, which creates the problem of obsolescence.

As camera elements have gotten smaller and more efficient, cameras have become ubiquitous. It is common to find camera components embedded in wireless phones and devices (PDAs), tablets and mobile computers. Not only are these optical systems able to process still digital images, but they are also able to capture, process, filter and manage digital video images. The problem remains, however, whether in digital cameras, digital video cameras or wireless devices with camera components, that the quality of the image produced is often poor. The smaller and cheaper the digital camera, digital video camera or digital optical device, the more problematic the image quality becomes.

So far, the idea of the digital camera has been limited to a device which contains integrated optical components, a sensor component, digital image signal processing circuitry, digital image filtration circuitry and digital file storage circuitry. However, each of these integrated components may be improved upon in a modular way and disintegrated in successor upgraded imaging devices.

It is possible to use digital imaging technologies to improve digital image problems such as optical and digital aberrations. Solomon (U.S. Pat. No. 7,612,805) has developed a digital imaging system for filtration to improve optical and digital aberrations created by lens and sensor constraints. Specific digital imaging filtration techniques are available as algorithms applied to specific imaging problems.

In addition to providing filtration, digital imaging provides the opportunity to manipulate the image to user preferences. For example, it is possible to manipulate depth of field in digital images by controlling lens aperture.

The digitalization of images further allows digital files to be transmitted on computer networks for storage. Shutterfly has developed a business model based on the storage and management of digital images on computer network servers and databases for photo sharing.

The dominant model for advanced digital photography is the digital single lens reflex (D-SLR) camera. In the main, most D-SLR cameras are organized to work within one paradigm. Film-based SLR cameras operate by using a lens apparatus connected to a camera body. When a shutter button is depressed, a microprocessor in the camera activates a shutter in the camera and an aperture in the lens to capture light onto a plane of film after a mirror flips up exposing the film. The silver-halide-based film is then chemically developed and images are preserved.

In a D-SLR, when the shutter button is depressed, a microprocessor (or SoC) in the camera activates a shutter in the camera and an aperture in the lens to capture light onto a digital sensor after a mirror flips up exposing the digital sensor. The sensor is typically either a charge coupled device (CCD) or a complementary metal-oxide semiconductor (CMOS) circuit that converts light to electrons. Once the sensor is exposed to light from the lens, camera circuitry moves the data from the sensor to a digital signal processor (DSP). The DSP performs a set of functions that filter the digital image file and transfers the converted data file to camera circuitry that stores and displays the corrected image file. A microprocessor (or SoC), which accesses a database in the camera, controls the image exposure settings, the internal camera circuitry and the mechanical operations of the shutter. In some cases, the camera microprocessor circuitry provides feedback to a microprocessor in the lens in order to measure and control the lens aperture and to synchronize exposure information between the lens aperture and the camera shutter. The user is able to manipulate the lens aperture, the camera shutter speed, the camera ISO speed, the data compression rate, and, in some cases, artificial light (such as a flash). The camera circuitry converts an analog image to digital format and converts the digital file to an analog image for presentation.

When any of these digital camera components can be improved, it is unfortunately necessary to upgrade the entire camera system. This process of upgrading a camera is costly and inefficient for the user. What is needed is a modular system that is able to upgrade different camera components independently.

SUMMARY OF THE INVENTION

The present modular multi-functional camera system allows the separation of an optical mechanism from the main components of digital imaging circuitry. The digital capture mechanism can essentially be separate from the digital image filtration components. The digital imaging and filtration circuitry may be separated from the digital storage components. The idea of a camera is thus disintegrated into differentiated components that may be in different locations.

In addition to being physically separated, the disaggregated camera may be modular. Each of the camera components is upgradable without affecting the other components. For example, a digital imaging sensor may be periodically upgraded while not affecting other imaging components. Not only does this concept of camera component modularity increase efficiency of processing digital images but it progressively improves image quality as the components are successively upgraded over time.

The present system therefore develops a modular camera system for image capture, filtration, optimization, display and management of digital still or video files. Each of these camera components may be performed on different platforms. For instance, the digital image capture occurs at one location while the digital filtration occurs at a second location, modeling, analysis and optimization of the digital image at a third location, the digital image management occurs at a fourth location and the image is finally displayed at a fifth location. At any stage in the process, the user may maintain control of the imaging process. In fact, since there is more computer processing and data storage capacity in computer networks than in a camera, the image work flow process is accelerated while the image quality improves appreciably.

Development of the present modular multi-functional digital imaging system results from understanding the limits of digital photography. While digital cameras have evolved in the last few years to include intra-camera computer circuitry for digital image processing, there are significant limits to all aspects of the in-camera components. First, the digital sensor has size and precision constraints. Second, the camera (and lens) electronic circuitry (MPs, ASICs, SoCs and DSPs) have processing constraints. Third, as the camera sensor size increases, the digital image file size correspondingly increases, posing substantial storage limits on the internal camera processing and storage components. Because of the increase in data set and file size, the camera circuitry has limits of multi-tasking. With increased file size also comes a limit in in-camera feedback, which slows down the imaging process. While camera manufacturers can invest in faster chips, this increases the cost of the camera, which further exacerbates the obsolescence problem. Though digital photography has a number of advantages over film photography, there are constraints inherent in the evolution of digital imaging technologies.

The challenges presented here, then, include (a) how to evolve and apply algorithms for digital camera applications, (b) how to optimize digital images with remote network computer database management systems, (c) how to optimize digital video imaging with an external network computer system, (d) how to analyze digital images in real-time and (e) how to optimize a digital video image, Digital imaging has become ubiquitous in recent years. Consequently, the present invention applies to a range of imaging technologies. The imaging devices and systems to which the present invention applies include all digital cameras and digital video cameras. These camera devices include cell phones, PDAs, telephones, video camcorders, digital video cameras, digital SLRs, laptops, netbooks, tablet computers and video teleconferencing systems. The system also applies to medical diagnostics, sensor networks, satellite imaging systems, printers and copiers.

The present system solves a range of imaging multi-objective optimization problems (MOOPs). For example, the system modulates shutter speed, aperture and ISO (and flash) to optimize DOE Also, the system modulates exposure, zoom and video. DSPs and image processing circuitry are optimized to solve each type of MOOP.

The present invention provides a set of advances to the field of digital imaging.

Novelties of the Invention

The present system develops a disaggregated digital imaging system which consists of a set of modular components. Viewed in this light, cameras will consist of less internal image processing components, which will control their costs and persistent obsolescence. Instead, the digital image processing components are external to the camera, downloaded to the camera or contained in external devices such as laptop or network computers. For example, the digital image filtration, analysis, modeling and optimization functions are better performed off-site.

The present invention reconceptualizes DSPs, which are a main processing engine of modern digital cameras. DSPs are able to process multiple pathways, to download customized algorithms and to modulate their resources based on user demands. In effect, the DSP is changed from a fixed camera circuit function to a process used to optimize individual user workflow.

External computer networks become integrated into the extended modular camera system by utilizing broadband bandwidth. As broadband bandwidth becomes a commodity, access to computer networks becomes a utility. The present invention conceives of digital image processing as a service in which images are analyzed, filtered, optimized and stored in computer networks, but controlled by user customization.

Advantages of the Invention

Digital imaging technologies provide opportunities to improve photography over the generation of film imaging technologies. With the present invention, cameras become modular and obsolescence is substantially limited.

The present system allows the camera to be disaggregated into specific upgradable components that allow the management of image work flow in order to optimize image quality for each user. There are layers of features available to users on demand that turns imaging into a process. Image processing speed is improved along with the dramatic increase in the size and quality of image files.

The combination of these elements suggests that each camera is personalized for each user at the most efficient cost. As each photographer uses more features, the camera as service process increases the fees correspondingly. Each user may optimize the digital imaging process by using extensive computer network functionality of image file analysis, modeling, filtration, optimization, storage and display.

Overall, camera prices decline markedly while image quality dramatically increases in the present system. Smaller imaging components in inexpensive devices (PDAs, smart phones, tablets, laptop computers and so on) become feature rich elements that optimize digital imaging and digital video.

LIST OF ABBREVIATIONS

ASIC, application specific integrated circuit
CCD, charge coupled device
CMOS, complementary metal oxide semiconductor
CRT, cathode ray tube
DCT, discrete cosign transform
DOF, depth of field
D-SLR, digital single lens reflex (camera)
DSP, digital signal processor
DVI, digital video imaging
EPCA, exposure priority camera activation
FPGA, field programmable gate array
FFT, fast Fourier transform LCD, liquid crystal display
LED, light emitting diode
MOOP, multi-objective optimization problem
OLED, organic light emitting diode
OPCA, object priority camera activation
PDA, personal digital assistant
RGB, red green blue
SDI, still digital image
SoC, system on chip

DESCRIPTION OF THE MAIN EMBODIMENTS OF THE INVENTION

Digital Image Filtration Processes

Digital image filtration is critical to transforming and optimizing digital images. Typically, digital filtration algorithms in DSPs are used to filter the image in the camera.

Digital cameras use optical and digital processes to capture light onto sensors. The effect of using the optical lenses and digital electronics in modern digital cameras produces a set of compromises that result in optical and digital aberrations. For example, in the case of zoom lenses, a compromise is often made between wide angle focal lengths and telephoto focal lengths. The zoom lens therefore produces a set of vignetting and pin cushioning optical aberrations at wide angle settings and chromatic aberrations at telephoto settings. In addition, optical aberrations include moiré and aliasing patterns that result from the convergence of parallel lines.

Optical aberrations vary with lens type. All lenses have diffraction effects after f/11, for example. Wide angle lenses have pin cushion and barrel distortion. Super-wide angle lenses also have moustache effect distortion.

Most lenses have chromatic aberrations (CAs). CAs include longitudinal chromatic aberration (color fringing around high contras edges in the front plane of focus), lateral chromatic aberration (color fringing—typically blue-yellow—at high contrast edges towards the edge of the frame), secondary lateral chromatic aberration (purple fringing), axial chromatic aberration and spherochromatism (out-of-focus bright areas behind the subject that has green fringes or out-of-focus bright areas in front of the subject that has magenta fringes).

Lenses with extra dispersion glass minimize, but do not eliminate, CAs. The current system uses in-camera filtration to correct the CAs in real time by applying algorithms in the camera DSP(s).

In the case of digital aberrations, the digital sensor itself (CCD or CMOS) produces a set of aberrations that require filtration. For instance, a low pass filter is typically affixed to a sensor to limit distortion. A Bayer filter is used to provide color to grey scale sensor outputs. Some of these filtration processes themselves (e.g., a low pass filter) create image distortions. All of these aberrations require filtration to optimize the image. One of the benefits of the digital imaging format is the ability to develop in-camera hardware and software technologies that optimize and manage the filtration of optical and digital image aberrations.

The present system offers a set of methods to improve the digital filtration process in camera, including providing pre-set filtration and post-capture filtration, using in-camera filtration layers and a filtration sequencing process. Further, the system accommodates the use of DSPs in printers and copiers for image filtration and user selection of display format options.

(1) Method for Organizing Pre-Set Digital Image Filtration Algorithms

In the present invention, common aberrations are identified and input into the camera microprocessor (SoC or CPU). The microprocessor accesses a database of specific aberrations associated with each lens. Once a specific lens is attached to the camera, the microprocessor accesses the database to retrieve a map of the specific optical aberrations associated with the lens. In addition, the map contains specific solutions to aberrations. The solutions are forwarded to the DSP. When an image is taken, the data file from the sensor is forwarded to the DSP, which applies the specific filtration process to correct a specific set of optical aberrations under specific conditions.

One example of using in-camera pre-set digital image filtration algorithms is in applying polarization optimization to an image. In analog image capture, a polarized filter is placed on the lens to filter polarized light waves. When the image is captured, the polarized light from one angle is filtered before it hits the film plane. In the case of digital photography, however, this filtration process is performed in a DSP, which uses a software algorithm to emulate the polarized filtration process. The camera selects a polarization filter algorithm to apply to specific image types.

Each camera contains a set of ASICs to perform specific digital image file processing operations. In some cases, the ASICs (e.g., a DSP) filter the image file. Digital aberrations created by the digital sensor, specific filters (such as low pass filter or anti-aliasing filter) and ASICs used to perform specific operations, are assessed by the microprocessor or SoC. The microprocessor or SoC accesses a database of specific digital aberrations and accesses a map of solutions to the digital aberrations. The microprocessor or SoC then forwards the solutions to the DSP to apply specific algorithms to correct the aberrations. The DSP applies the algorithms to the image file and forwards the file to storage.

(2) Method for Organizing Post-Capture Digital Image Filtration in Remote Computer As the functions of the digital camera become disaggregated, the camera itself may only capture the image with a lens and a sensor. The resulting data file is then forwarded to an external computer for further processing. In this case, data on the specific lens aberrations and sensor aberrations are maintained in a database accessed by the computer. The computer accesses a map of the solutions to the optical and digital aberrations and forwards the algorithm solutions to a DSP. The image data file is forwarded to the DSP and the map of algorithm solutions are applied to the data file. Once applied, the file is forwarded to storage.

One advantage of this model is that large data analysis resources are used in a remote computer. In addition, at least one DSP may be employed to process a set of images so as to accelerate image processing.

In one embodiment, the corrected image data file is then transferred to the camera for review. The corrected image data file may then be sent to a display for viewing.

The net effect of this method is to process the image file after capture in a remote location so as to optimize workflow.

(3) Digital Image Filtration Work-Flow Method

There are several main filtration processes. First, there is pre-capture filtration, typically used on analog cameras. In this model, glass filters are placed on the front or rear of a lens to capture a specific effect. For instance, the camera may have a polarizing filter, a red filter to limit a specific color of light or a soft effects filter.

Second, there is concurrent capture digital filtration. In this case, a DSP in the camera processes the data file at the time of image capture as the image file is sent from the sensor through the camera circuitry to the internal camera storage.

Third, there is post-capture digital filtration. In this case, filtration of an image file occurs after image file storage.

In the present invention, once a camera uses its lens and sensor to capture an image, the data file is sent to another camera for processing. This master/slave model is useful in order to use multiple stripped down cameras that forward image data files to the main camera for processing. The central camera has upgraded DSP(s), ASICs, SoCs and storage to facilitate work flow from multiple slaves. While the central camera filters and optimizes the image files, the filtered files may be forwarded to the slave camera for review.

In an embodiment of the invention, after a digital camera captures an image, creates an image file and stores the data file in memory, the camera analyzes the image file and applies specific filtration. In effect, the stored original data file is filtered by the camera DSP after capture, not during the original capture and image processing phase. One advantage of this approach is to accelerate the workflow of the original capture so that many images can be captured and stored and then afterwards the most preferred images can be retrieved from storage and filtered. In this case, a DSP may be employed in the display circuitry to enable the user to manipulate and adjust the filtration programming to suit their taste.

(4) Method for Organizing Customized Digital Image Filtration Functions

While there are aberration types that are consistent between lenses and camera electronics, some aberrations are unique. These aberrations require a unique algorithm solution. In these cases, it is necessary for the camera microprocessor or SoC to analyze the problem and customize the solution for each unique aberration. For example, a specific lens may have a unique optical aberration, or, over time, the lens may accumulate a set of aberrations. The camera microprocessor or SoC compares the optical aberrations of a specific set of image files used by a specific lens to a regulator digital image file in the database and constructs an algorithm to correct the optical aberrations. The same comparison process of algorithm construction is used after analysis of a digital sensor (and digital files) as it accumulates specific aberrations (such as dead pixels, imprecise color rendering, etc.) over time. The camera MP or SoC constructs an algorithm to correct the digital aberrations. The camera microprocessor or SoC forwards the customized algorithm to the DSP to apply to subsequent image files that contain the specific aberrations.

In effect, the method provides an on-demand image aberration problem solving mechanism to construct and apply a customized filtration algorithm solution to a custom problem. In order to perform this process, the camera downloads specialized software just-in-time to program the microprocessor or SoC to perform the analysis and solution construction process. As new software programming becomes available to solve complex aberration problems, the camera accesses subsequent computer programs. In one implementation, the camera accesses a library of software programs to solve different classes of optical and digital aberrations to perform, and to accelerate, this process. In one model, the camera user subscribes to a software service which allows access to continued upgrades.

(5) System for In-Camera Digital Image Filtration Layers

Because more than one aberration exists in the optical and digital spheres, it is necessary for digital cameras to apply filtration techniques to more than one aberration at a time. In order to perform this multi-solution filtration process, the camera uses a microprocessor (or SoC), ASICs and a DSP(s) to analyze and solve the aberration problems. However, when there are multiple aberrations, and multiple filtration solutions, each of the filters are applied sequentially. Multiple algorithms are applied by the DSP in a sequence to solve the varied aberrations.

The present method uses a set of layers to control the multi-aberration filtration process. By using layers, and by applying a specific algorithm at a time, it is possible to see the effects of a specific filter and to adjust the process. In effect, a palate of multiple filters is used in which multiple filtration layers are added or subtracted to suit the user's taste.

This model of digital camera filtration is best used after the image is captured and when the stored image file is filtered. In this case, the user can experiment with filter layers, by adding and subtracting multiple effects and combining the various filters on demand. This process allows users to make a change one layer at a time rather than to perform multiple simultaneous filtration techniques simultaneously. The ability to control the layering of the filtration process provides more user control to image optimization. This approach is particularly useful when the user is experimenting with creative control of special effects beyond the correction of optical and digital aberrations alone.

(6) Method for Organizing Digital Image Filtration Sequencing

Because there are multiple aberrations in digital camera imaging, there is typically a sequence of filtration techniques applied to correct the aberrations. The present system uses a method to simultaneously filter multiple image aberrations. Since each image has a combination of different aberrations, the camera microprocessor identifies the multiple aberrations by comparing the image files to a regulator set of image files in a database. The microprocessor or SoC then identifies or constructs algorithms to correct the aberrations. The algorithms are then forwarded to the DSP for application to the image files as they are forwarded from the sensor to the ASTCs and DSP. After the DSP applies the filtration algorithms, the files are forwarded to storage.

In some cases, in order to reduce or eliminate the aberration, the camera microprocessor or SoC forwards a signal to the lens microprocessor to change a lens setting, such as aperture or focus, in order to reduce the aberration before it is captured on the sensor. This process is useful to prevent the aberration, such as created by a wide open lens, in the first place.

Once the user selects specific filters to apply to the image, including aberration optimization filters or special effects filters, the camera microprocessor or SoC combines the specific filters in a sequence of steps to apply the unique combination of filtration algorithms to the imaging file.

The user selects which filters to activate and deactivate. Consequently, the unique combination of filtration for specific images produces a unique image for each user selection.

(7) Method for Filtration in Video

The present invention adjusts image filtration of sequential images in a video. The images are filtered frame-by-frame.

The camera CPU or SoC accesses a database of algorithms to perform a specific filtration sequence on multiple video images. Since the different image frames may require different filtration for different optical and digital aberrations, the CPU or SoC activates different algorithms for the different filtration options. The CPU or SoC identifies the filtration requirements by accessing a database and forwards the algorithm(s) to the DSP(s).

Since the video consists of multiple frames (typically 30 fps) and since the images vary in content, the CPU or SoC assesses the multiple frames, analyzes the patterns and anticipates the pattern of filtration in real time so as to efficiently apply filtration. This process of aberration assessment and filtration application is particularly useful when zoom lenses change focal length positions. The CPU or SoC assesses the direction of the pattern of aberrations, accesses the database to select appropriate filtrations and applies the filtrations in the DSP(s). This process is dynamic. For example, as objects are tracked with the zoom lens in a video, the filtration process is continuous.

(8) Method for Organizing Image Display DSPs for Digital Image Filtration

While camera functions may be disaggregated, the filtration function of DSPs in the present invention is integrated into an image display. In-camera display circuitry contains a DSP to filter aberrations. The camera microprocessor (CPU or SoC) assesses generic optical aberrations associated with specific lens types and tags the meta-data in the image file. The display DSP circuitry then filters the aberration according to pre-set parameters. Similarly, digital aberrations are identified and filtered by the display DSP circuitry by applying algorithms. Finally, special effects filtration algorithms are applied to image files by display DSP circuitry to suit individual creative preferences.

The advantage of using display circuitry with a DSP allows the camera circuitry to emphasize processing files through the sensor and into storage. The post-capture image work flow using a display circuitry DSP allows simultaneous parallel image filtration processing.

In one embodiment, the display is external to the camera. A remote computer display is used to filter images from the camera after the image files are transferred to the computer for processing. For example, a tablet computer provides a larger screen than the camera screen, which allows for greater user editing control of images with DSP feedback of filtration preferences. In some cases, more powerful computers and DSPs are embodied in tablet computers and similar displays to allow increased workflow flexibility. Multi-attribute DSPs and multiple DSP networks in displays allow rapid interaction to filter digital images forwarded from cameras. The filtered images are then transferred back to the camera for storage and review.

(9) Method for Applying Filtration to Digital Image Using DSP in Printer

As computer technology evolves, image printers are becoming increasingly multi-functional. The present invention facilitates the disaggregation of camera technology and allows the integration of printer technology into the digital image workflow process.

After a digital camera uses its lens and sensor to capture an image, the image file is stored in the camera. The camera transfers the image file to a remote printer circuit storage. The meta-data in the digital image file includes the camera lens, sensor data and exposure information. The original digital file is copied by the printer SoC and the original is retained in memory. The unfiltered copy of the original digital image file is analyzed by the printer microprocessor or SoC, which compares the image to images in its database. The printer microprocessor or SoC then recommends a specific set of filtration algorithms to apply to the image file copy. The image file copy is forwarded to the printer DSP, which applies the specific filtration algorithms and stores the filtration information in the image meta-data file. The filtered image file is then sent to the print circuitry for printing.

In an embodiment of the invention, the DSP in the printer is user adjustable to provide specific special effects to the image file. The effects include soft effects, red eye reduction and changing the color of the image as well as specific effects that are sold by third parties. The effects are added to the image file and are previewed by the user before printing. In any case, the original image file is preserved in storage.

In another embodiment, the DSP is embedded in a photocopier, which performs the same steps as the printer.

These technologies allow the camera to be the eyes of the work flow and the printer to be the output circuitry. The two mechanisms work in tandem to improve photographic endeavors.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

DESCRIPTION OF THE DRAWINGS

FIG. 4 is a flow chart showing how a camera SoC is used to correct digital image aberrations.

FIG. 5 is a schematic drawing showing an image file sent to an external computer for image filtration.

DETAILED DESCRIPTION OF THE DRAWINGS

The present invention pertains to digital imaging filtration of image aberrations. The filtration of images is performed by digital signal processors (DSPs) in conjunction with logic circuits (SoC, MP, CPU) and database management systems. The filtration is performed in the camera and out of the camera in different implementations. Algorithms are downloaded to a DSP to process the filtration of the image files to correct optical and digital aberrations and to provide supplemental filtration.

Figure 1:
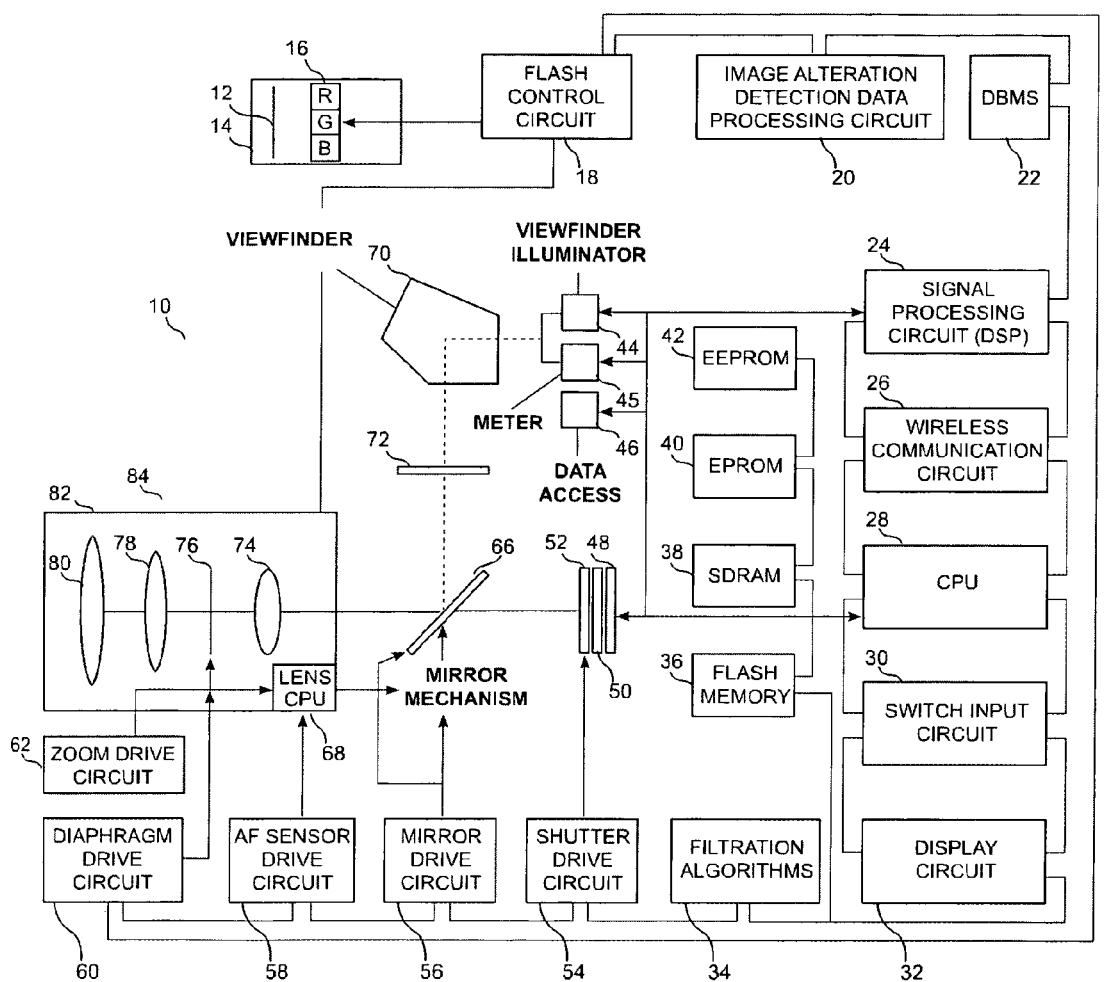
FIG. 1 is a schematic drawing of digital camera circuitry.

FIG. 1 shows the digital camera circuitry. The camera (10) consists of a housing with electronic circuitry to capture, process and store digital image files and a lens (84). The lens consists of a lens barrel (82), a set of lens groupings, including a front lens element (80), a middle lens element (78) and a rear lens element (74). The lens also includes a aperture diaphragm (76) and a lens CPU (68). In some cases, the lens includes at least one motor for autofocus. The lens may be a zoom lens or a fixed focal length lens. If the lens is a zoom lens, which provides a range of optical focal lengths, the lens includes a zoom drive circuit (62). The lens circuitry works in conjunction with the camera circuitry to maintain the aperture with a diaphragm drive circuit (60) and an autofocus sensor drive circuit (58).

In some, but not all cases, the camera contains a flash mechanism to provide artificial illumination. In FIG. 1, the flash mechanism is shown (14) with an illuminator (12) and a light apparatus (16) consisting of red, green and blue light functions. The flash mechanism is connected to a flash control circuit (18). In some cases, the flash mechanism is a separate apparatus that is attached to the camera device and is not internal to the camera.

The camera maintains a mirror in its single lens reflex (SLR) mode. In this case, the mirror mechanism (66) is operated by the mirror drive circuit (56). The mirror is in the down position in order to reflect light to a viewfinder (70) through a diaphragm (72) to allow the image from the lens to be viewed in the viewfinder. Not all embodiments of the invention, however, require a mirror mechanism. The viewfinder is illuminated (44) by a light in order to read information. Electronic data (46) is supplied to the user in the viewfinder, including the metering information provided by the camera metering system (45). The lens has a CPU (68) which may be a microprocessor or an SoC.

The camera uses a shutter apparatus (52), which is driven by a shutter drive circuit (54). When the mirror and the shutter are activated, light passes from the lens to the Bayer filter or anti-aliasing filter (50) and to the digital sensor (48). The digital image file is created by the digital sensor by converting photons to electrons. The image file is sent to either the signal processing circuit (DSP) (24) or the CPU (28). The image file is then sent to storage, typically a flash memory apparatus (36). In some cases, the image file is sent to an ASIC or cache for temporary storage before the DSP or CPU will process the file. In addition, the CPU may contain circuitry including an analog to digital converter, a digital to analog converter and a programmable gain amplification circuit. The CPU may be a microprocessor.

In order to process the file, the CPU and DSP store data and instructions in EEPROM (42), EPROM (40), SDRAM (38) and DBMS (22) components, retrieve the data and instructions, process the file and send the processed file to storage. The DSP and CPU uses filtration algorithms (34) to process the image file to correct for optical and digital aberrations. The aggregated camera circuitry may be contained in a single system on a chip (SoC) device, which integrates a set of microcircuits and memory devices with specific functionality.

The camera also uses a switch input circuit (30) to control the camera functions and an image alteration detection data processing circuit (20) to process the image. The image is viewed in a display, typically an LED or LCD on the back of the camera, which is controlled by a display circuit (32). The display circuit may contain its own DSP to process and filter image files. The camera also uses a wireless communication circuit (26) to communicate wirelessly with outside devices. The wireless circuit may be Wi-Fi (802.11 b/g/n), Blue tooth, 3G or 4G LTE. For example, the camera may upload image files to other devices or may download image files, software or algorithms from other devices. In another implementation, the camera by use USB 1.0, 2.0, 3.0, Fire wire or Thunderbolt communications connections.

The camera SoC, CPU and MP are used interchangeably for the purposes of describing camera circuit filtration operations. While the main camera MP or CPU may be a circuit on a camera SoC, the processes are the same.

Figure 2:
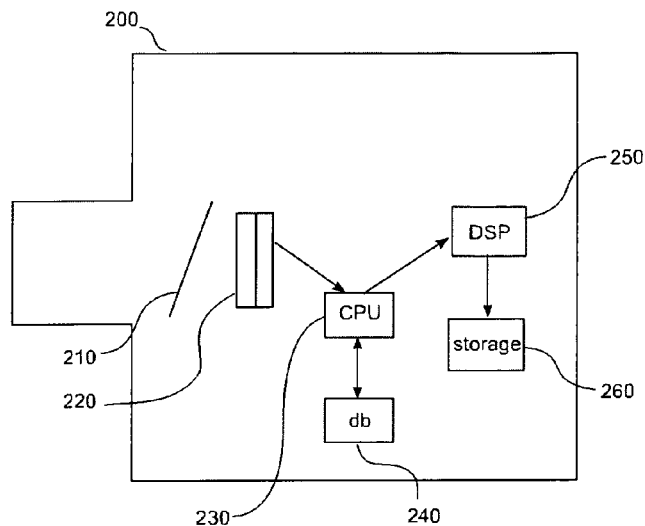
FIG. 2 is a schematic drawing illustrating the process of in-camera filtration.

FIG. 2 is a schematic drawing illustrating the process of in-camera filtration. The camera (200) shows a mirror (210), a sensor mechanism (220), a CPU (230), a DSP (250), a database (240) and storage (260). The image file from the sensor is sent to the CPU, which analyzes the file after accessing the dbms and sends the file to the DSP. Once the DSP applies a filtration algorithm, or algorithms, to filter the image file, the file is sent to storage.

Figure 3:
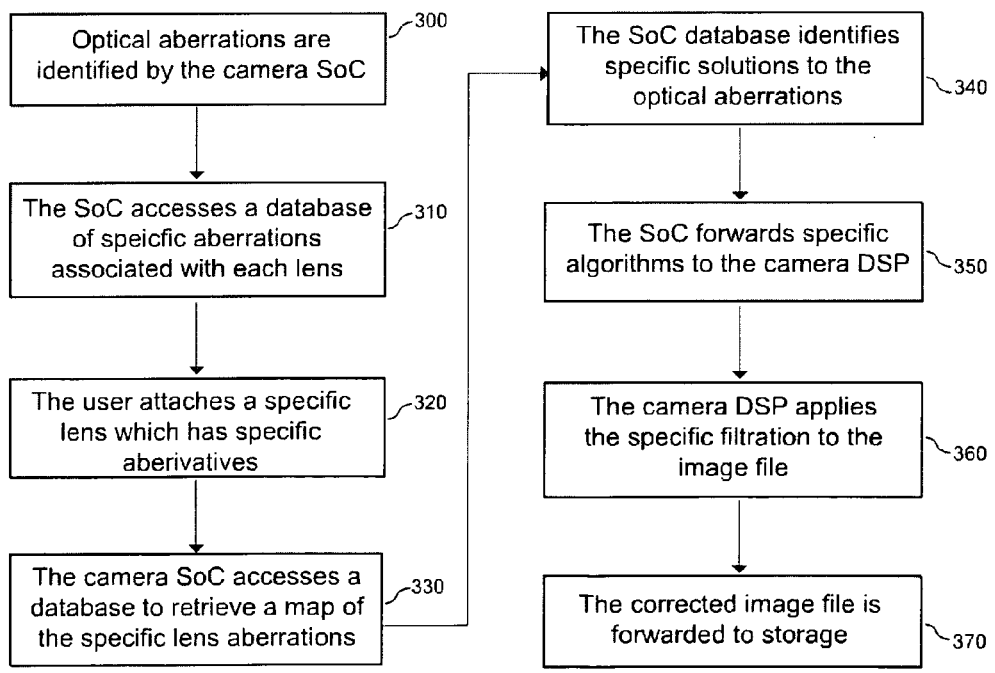
FIG. 3 is a flow chart showing how a camera SoC is used to correct optical image aberrations.

Much of the history of digital imaging shows solutions to optical and digital image aberrations. The camera corrects both optical and digital aberrations of image files. FIG. 3 describes the process of correcting optical image aberrations and FIG. 4 describes the process of correcting digital image aberrations.

FIG. 3 shows the process of using the camera SoC to correct optical image aberrations. After optical aberrations are identified by the camera SoC (300), the SoC accesses a database of specific aberrations associated with each lens (310). The user attaches a specific lens which has specific aberrations (320) and the camera SoC accesses a database to retrieve a map of the specific lens aberrations (330). The SoC database identifies specific solutions to the optical aberrations (340) and forwards specific algorithms to the camera DSP (350). The camera DSP applies the specific filtration to the image file (360) and the corrected image file is forwarded to storage (370).

FIG. 4 shows the process of using the camera SoC to correct digital image aberrations. After the digital aberrations created by the digital sensor and low pass (i.e., anti-aliasing) filter are accessed by the camera SoC (400), the camera SoC accesses a database of specific digital aberrations (410) and a map of solutions to the digital aberrations (420). The camera SoC forwards the solutions to the camera DSP (430), which applies the specific algorithms to correct the aberrations (440) and forwards the image file to storage (450).

FIG. 5 shows an image file sent to an external computer for image filtration. The camera (500) is shown with mirror (510), sensor (520) and storage (530) apparatuses. The image file is sent to the computer (540), which forwards the file to its database (550) and processes the image file in its DSP (560) before storing (570) the file. The corrected image file is then sent to the camera storage (530).

Figure 6:
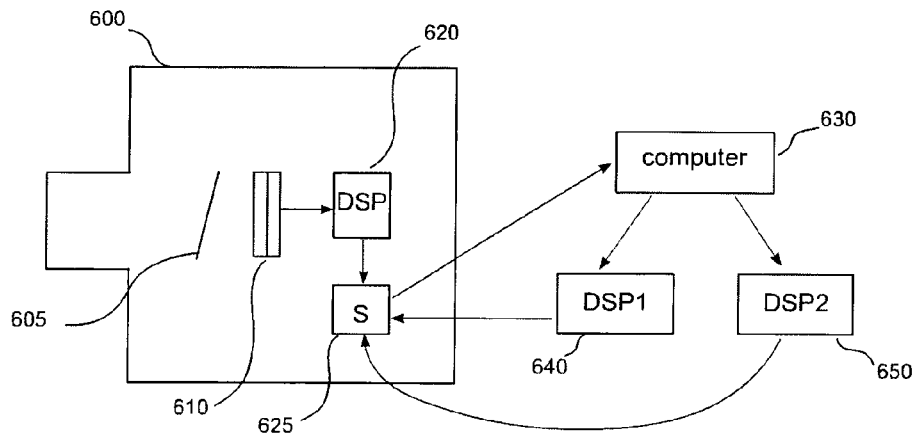
FIG. 6 is a schematic drawing showing two external DSPs filtering image files from a camera.

FIG. 6 shows two external DSPs filtering image files from a camera. The camera (600) is shown with mirror (605) and sensor (610) apparatuses. The image file is sent from the sensor to the camera DSP (620), which processes the image normally and sends the processed image file to storage (625). The image files are then sent from camera storage to an external computer (630), which filters the files with two DSPs (DSP 1) (640) and (DSP 2) (650) and returns the image files to the camera storage (625).

Figure 7:
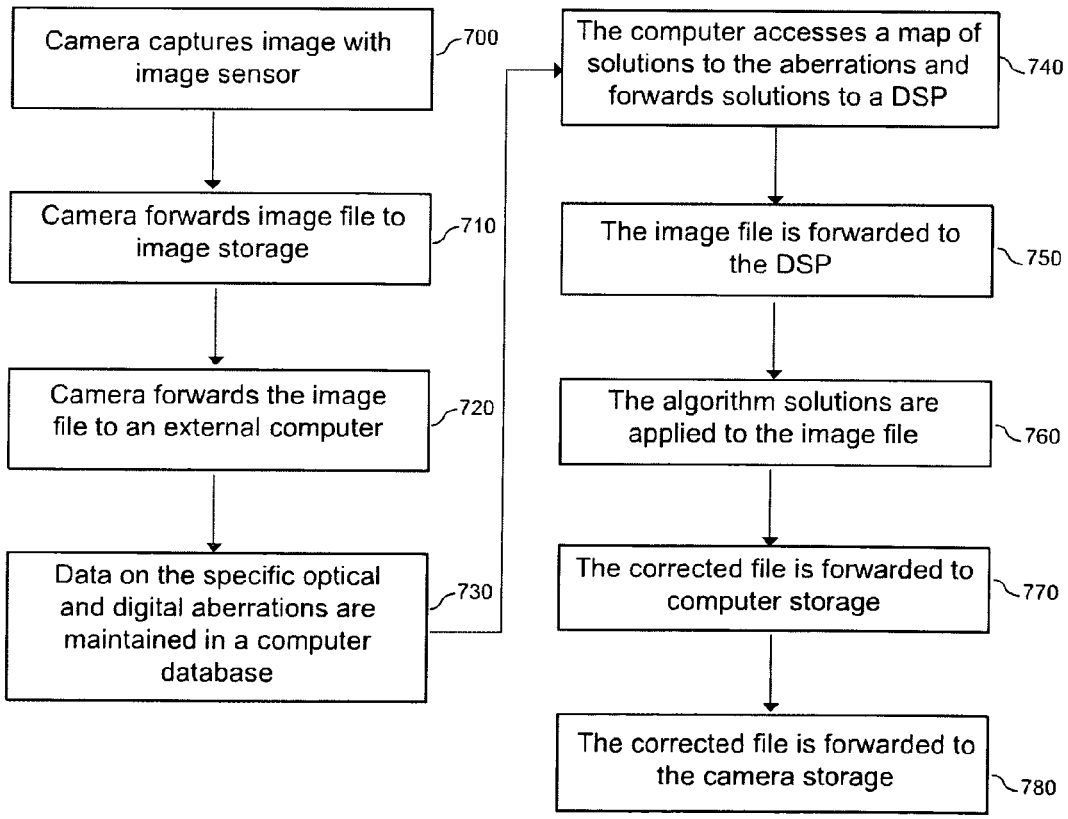
FIG. 7 is a flow chart showing the process of using an external computer to filter optical and digital image aberrations.

FIG. 7 shows the process of using an external computer to filter optical and digital image aberrations. After the camera captures an image with the image sensor (700), the camera forwards the image file to image storage (710). The camera forwards the image file to an external computer (720). The computer accesses data on the specific optical and digital aberrations in the computer database (730) and the computer accesses a map of solutions to aberrations and forwards the solutions, typically filtration algorithms, to a DSP (740). The image file is forwarded to the DSP (750), the algorithm solutions are applied to the image file (760) and the corrected image file is forwarded to computer storage (770). The corrected file is then forwarded to the camera storage (780).

Figure 8:
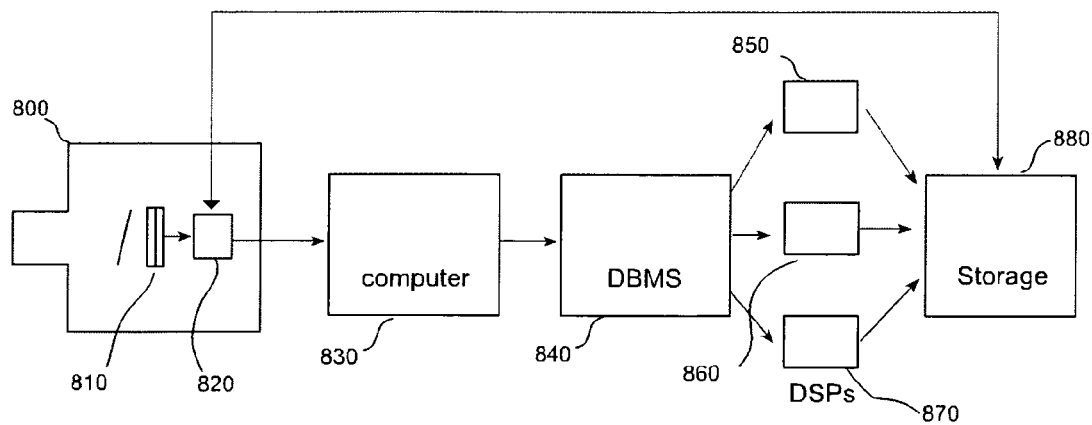
FIG. 8 is a schematic drawing showing the configuration of work flow to process an image file using a camera, an external computer and at least two DSPs.

FIG. 8 shows the configuration of work flow to process an image file using a camera, an external computer and at least two DSPs. The camera (800) uses the sensor (810) apparatus to forward the image file to camera storage (820). The file is then sent to an external computer (830). At least one image file is processed in the work flow. The external computer accesses the database (840) and forwards the image file to one of three external DSPs (850, 860 and 870), processes the image file and forwards the file to external storage (880). The filtered image file is then returned to the camera storage (820).

Figure 9:
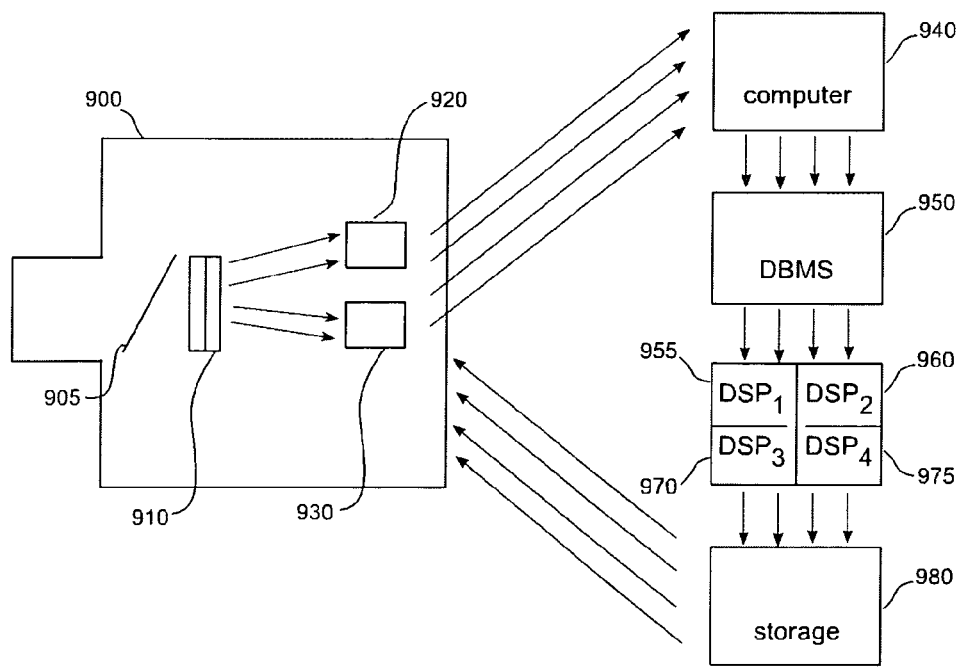
FIG. 9 is a schematic drawing showing multiple files processed in a workflow with a camera and external computation.

FIG. 9 shows the work flow process of processing multiple files with a camera and an external computer. The camera (900) is shown with a mirror (905) and sensor apparatus (910) and two storage components (920 and 930). The image files are exported to an external computer (940), which accesses a database (950) for solutions to image aberrations and filtration. The computer then sends the image files to one of four DSPs, DSP 1 (955), DSP 2 (960), DSP 3 (970) and DSP 4 (975) for filtration. The filtered image files are then sent to external storage (980) and sent back to the camera storage (920 and 930) for access and display.

Figure 10:
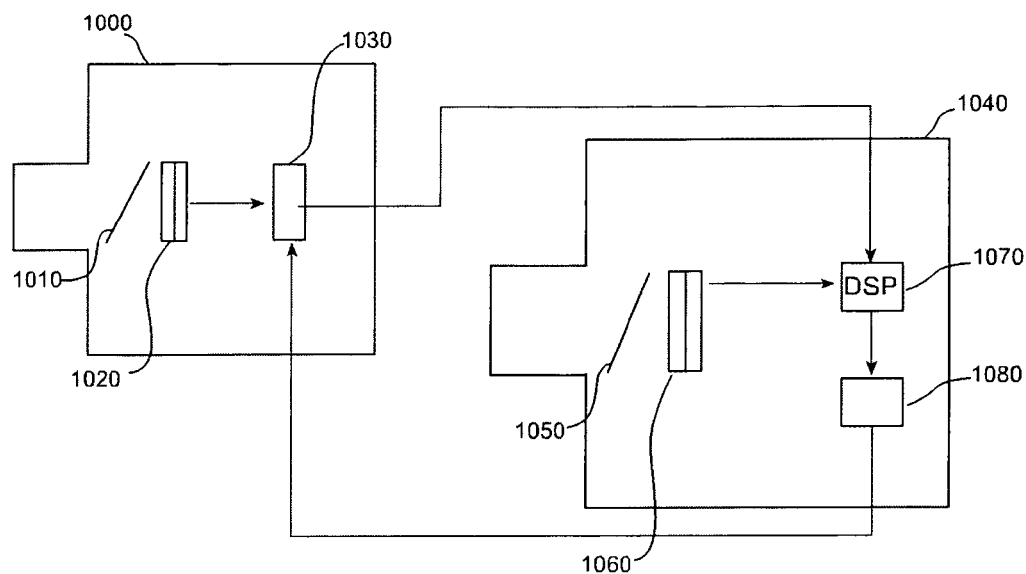
FIG. 10 is a schematic drawing showing a master/slave model of digital cameras in which the DSP of the second camera is used to filter an image file from the first camera.

FIG. 10 shows the use of a master/slave model of digital cameras in which the DSP of the second camera is used to filter an image file from the first camera. The first camera (1000) is shown with mirror (1010), sensor (1020) and storage (1030) components. Once the image file is captured by using the image sensor and sent to storage, the image file is sent to the second camera (1040). The second camera is shown with mirror (1050) and sensor (1060) apparatuses. The image file is received by the camera and sent to the DSP (1070) for filtration and then stored in the camera's storage (1080). The filtered image file is then sent back to the first camera's storage (1030). This approach is useful in order to have a simple satellite camera that can capture an image file while a more extensive filtration process is performed in a more substantial camera. In one mode, the first camera does not have a mirror mechanism.

Figure 11:
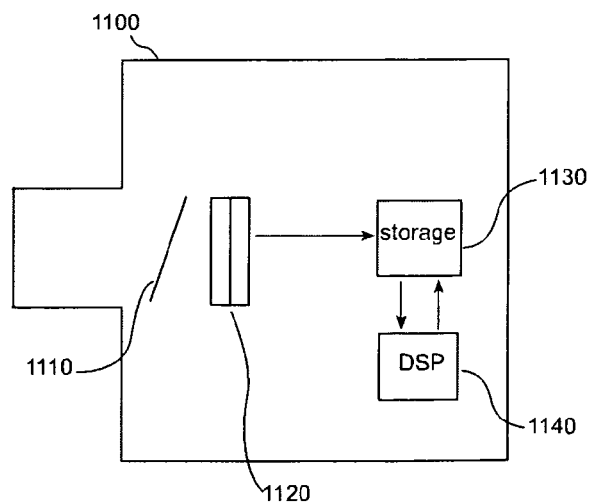
FIG. 11 is a schematic drawing showing the process of filtering an image file with a DSP after it is first stored in a camera.

FIG. 11 shows the process of filtering an image file with a DSP after it is first stored in a camera. Once the camera (1100) captures the image with the image sensor (1120) after using the mirror mechanism (1110), the image file is immediately sent to storage (1130). The image file is then sent to the camera DSP (1140) for filtration and, once filtered, sent back to storage (1130). This process has the advantage of allowing the user to shoot many images, but only filter and edit the most interesting images, thereby saving resources.

Figure 12:
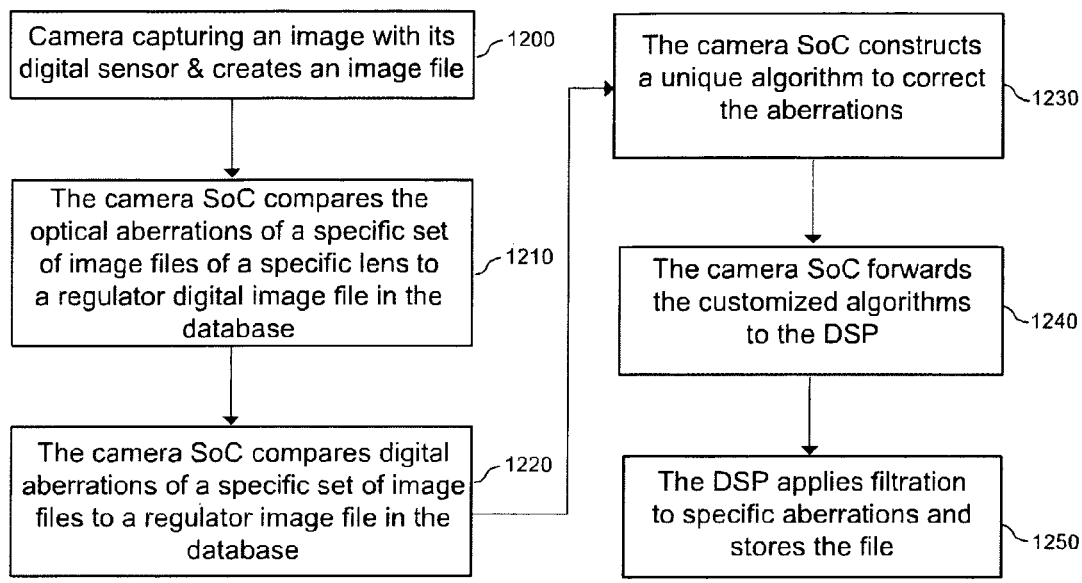
FIG. 12 is a flow chart showing the process of using a camera SoC to analyze an image file and constructing a customized algorithm that is applied by the camera DSP to filter the image file.

FIG. 12 shows the process of using a camera SoC to analyze an image file and constructing a customized algorithm that is applied by the camera DSP to filter the image file. After the camera captures an image with the digital sensor and creates an image file (1200), the SoC compares the optical aberrations of a specific set of image files of a specific lens to a regulator digital image file in the database (1210). The camera SoC then compares digital aberrations of a set of image files to a regulator image file in the database (1220). The camera SoC constructs a unique algorithm to correct the aberrations (1230) and forwards the customized algorithm to the DSP (1240). An image file is forwarded to the DSP, which applies filtration to specific aberrations (1250). The corrected file is then stored in memory.

Figure 13:
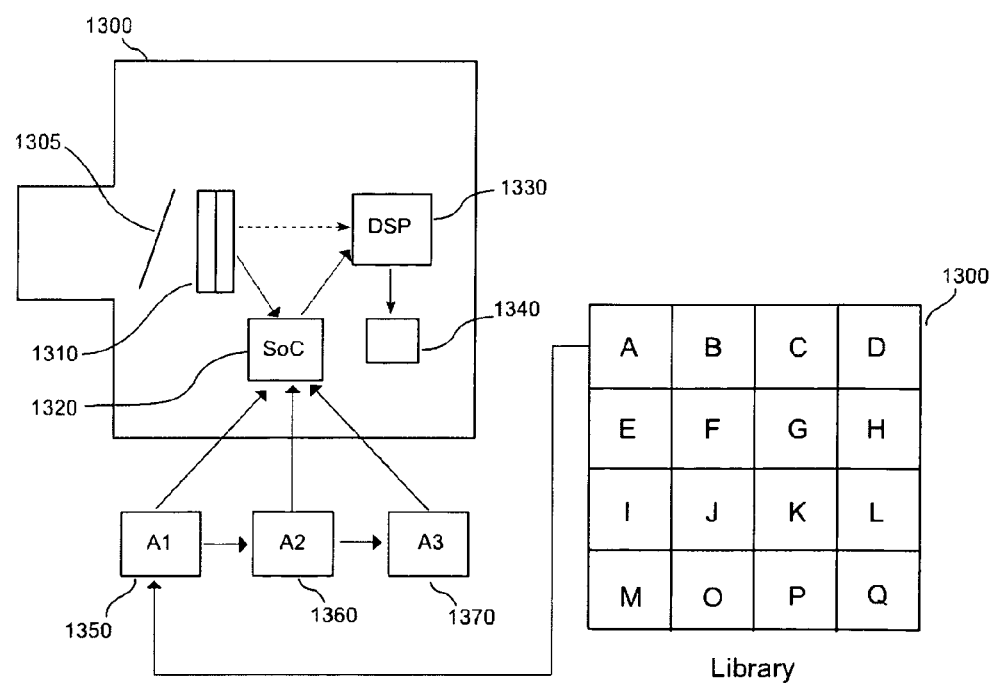
FIG. 13 is a schematic drawing showing multiple versions of an algorithm downloaded from a library to a camera to apply image file filtration.

FIG. 13 shows the process of using multiple versions of an algorithm downloaded from a library to a camera to apply image file filtration. The camera (1300) is shown with mirror (1305) and sensor (1310) apparatuses. The image files are sent to the camera SoC (1320) initially and then to the DSP (1330). In some cases image files are sent directly to the camera DSP. Once the DSP processes the image files they are sent to storage (1340). An external library of algorithms (1300) contained in a computer downloads several versions of algorithm A to the camera SoC over several phases. In the first phase, algorithm A1 (1350) is downloaded to the camera SoC. In a second phase, algorithm version A2 (1360) is downloaded to the camera SoC and then algorithm version A3 (1370). The SoC accepts the updated algorithms and updates the software to perform specific filtration functions, which are then passed to the camera DSP to process image files.

Figures 14, 15:
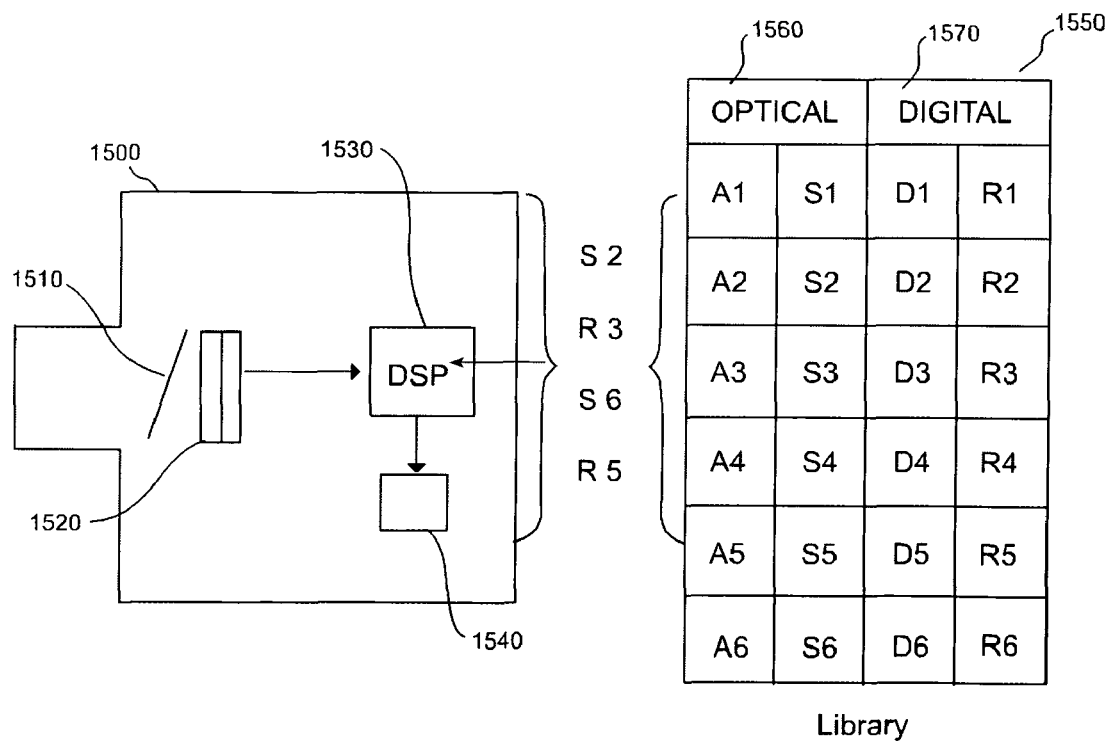
FIG. 14 is a table showing the phases of applying filtration to different optical and digital aberrations in an image file.
FIG. 15 is a schematic drawing showing the use of specific algorithms from a library applied to a camera DSP.

FIG. 14 is a table showing the phases of applying filtration to different optical and digital aberrations in an image file. Over a set of phases (Phases 1, 2, 3, 4, 5 and 6) (1400, 1410, 1420, 1430, 1440 and 1450), the different optical and digital aberrations are solved with different algorithms (A1 to A6).

FIG. 15 shows the use of specific algorithms form a library applied to a camera DSP. The camera (1500) is shown with mirror (1510) and sensor (1520) apparatuses. Once the image file is captured, it is sent to the camera DSP (1530) for filtration and then to camera storage (1540). The external computer database (1550) is shown with a library of optical (A1 to A6 and S1 to S6) image aberration algorithms and digital (D1 to D6 and R1 to R6) image aberration algorithms. In this example, algorithms S2, R3, S6 and R5 are downloaded to the camera DSP and applied to image files for filtration before being sent to camera storage.

Figure 16:
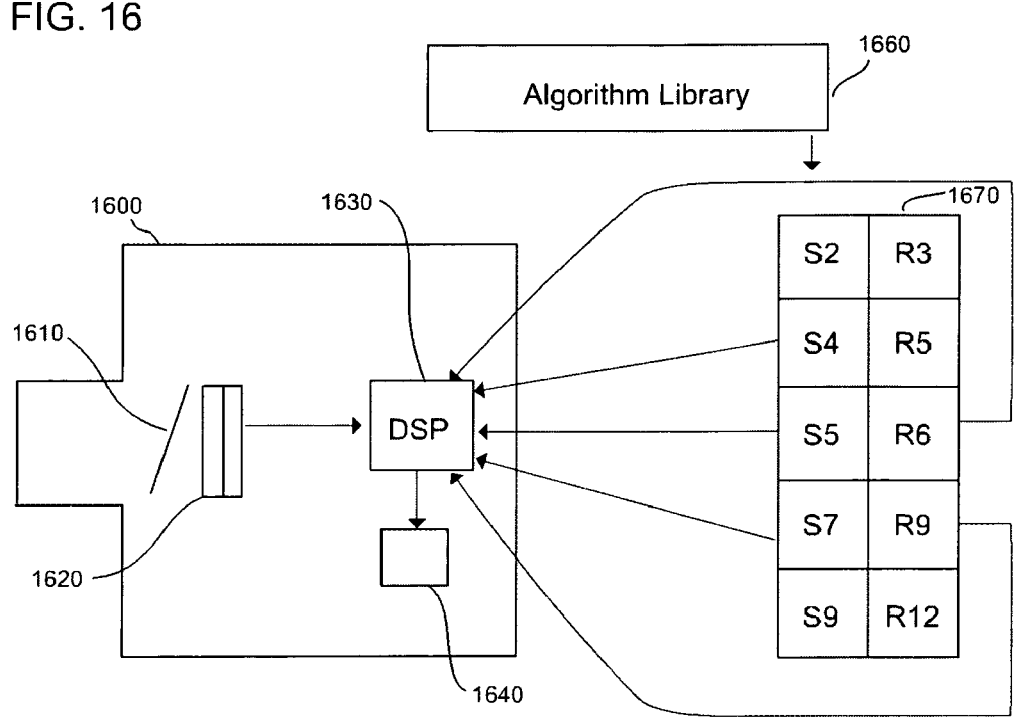
FIG. 16 is a schematic drawing showing the process of a user selecting (and subtracting) filtration in layers.

FIG. 16 shows the process of a user selecting (and subtracting) filtration in layers. The camera (1600) is shown with mirror (1610) and sensor (1620) apparatuses. The image file is captured and sent to the camera DSP (1630). The external algorithm library (1660) and algorithms (1670) (S2, S4, S5, S7, S9, R3, R5, R6, R9 and R12) are shown. The algorithms are downloaded to the camera DSP and applied to image files before being stored in the camera storage (1640).

Figure 17:
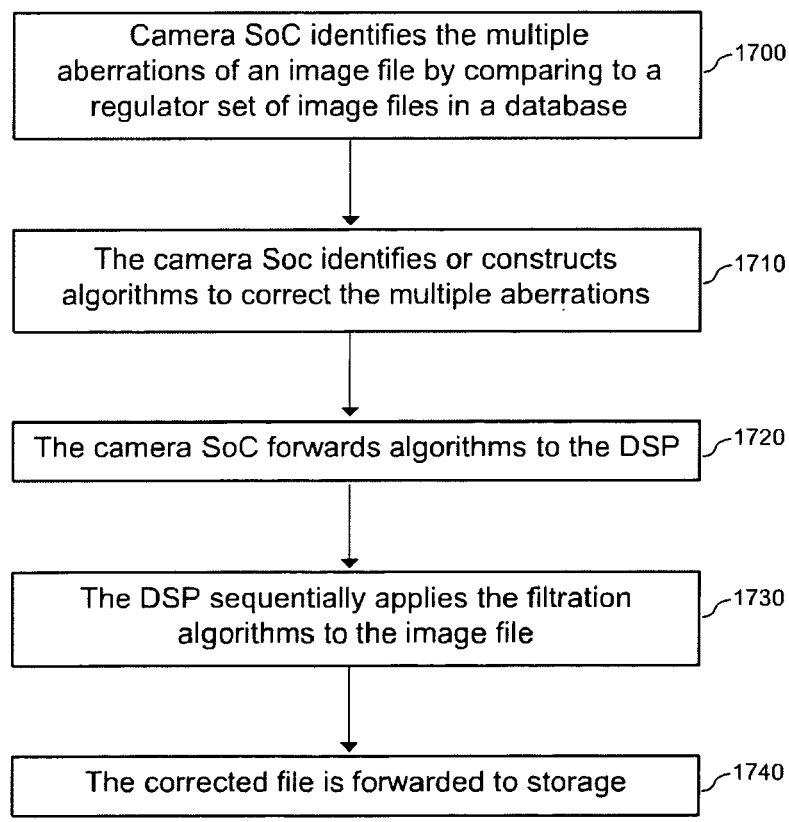
FIG. 17 is a flow chart showing the process of using the camera SoC to elect algorithms to correct multiple aberrations in an image file.

FIG. 17 shows the process of using the camera SoC to elect algorithms to correct multiple aberrations in an image file. After the camera SoC identifies the multiple aberrations of an image file by comparing to a regulator set of image files in a database (1700), the camera SoC identifies or constructs algorithms to correct the multiple aberrations (1710). The camera SoC forwards algorithms to the DSP (1720) and the DSP sequentially applies the filtration algorithms to the image file (1730). The corrected file is forwarded to storage (1740).

Figure 18:
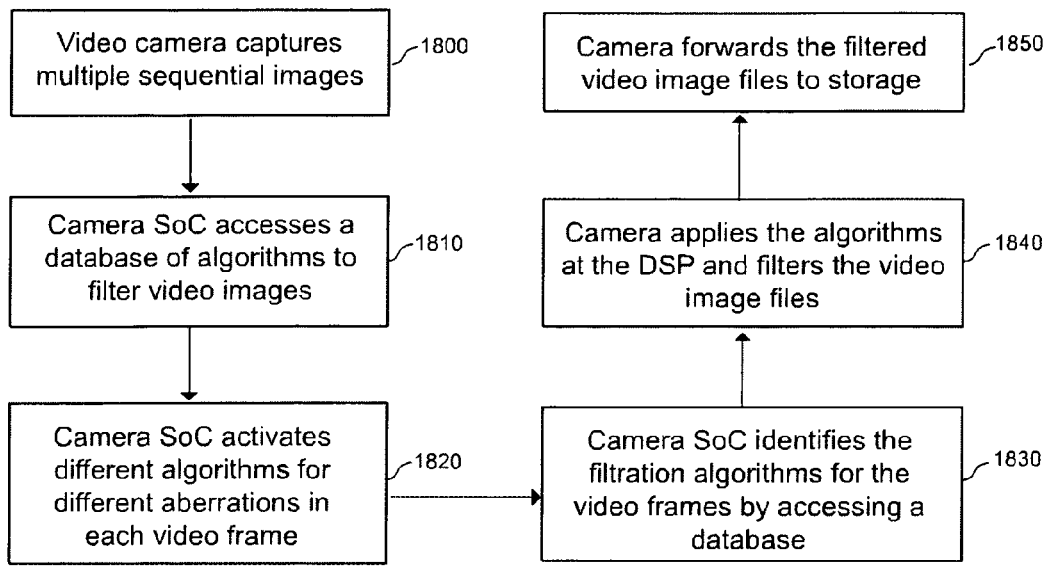
FIG. 18 is a flow chart showing the process of using the camera SoC to apply algorithms to correct aberrations to a video file.

FIG. 18 shows the process of using the camera SoC to apply algorithms to correct aberrations to a video file. After the video camera captures multiple sequential images (1800), the camera SoC accesses a database of algorithms to filter video images (1810). The camera SoC activates the different algorithms for different aberrations in each video frame (1820) and identifies the filtration algorithms for the video frames by accessing a database (1830). The camera then applies the algorithms at the DSP, filters the video image files (1840) and forwards the filtered video image files to storage (1850).

Figure 19:
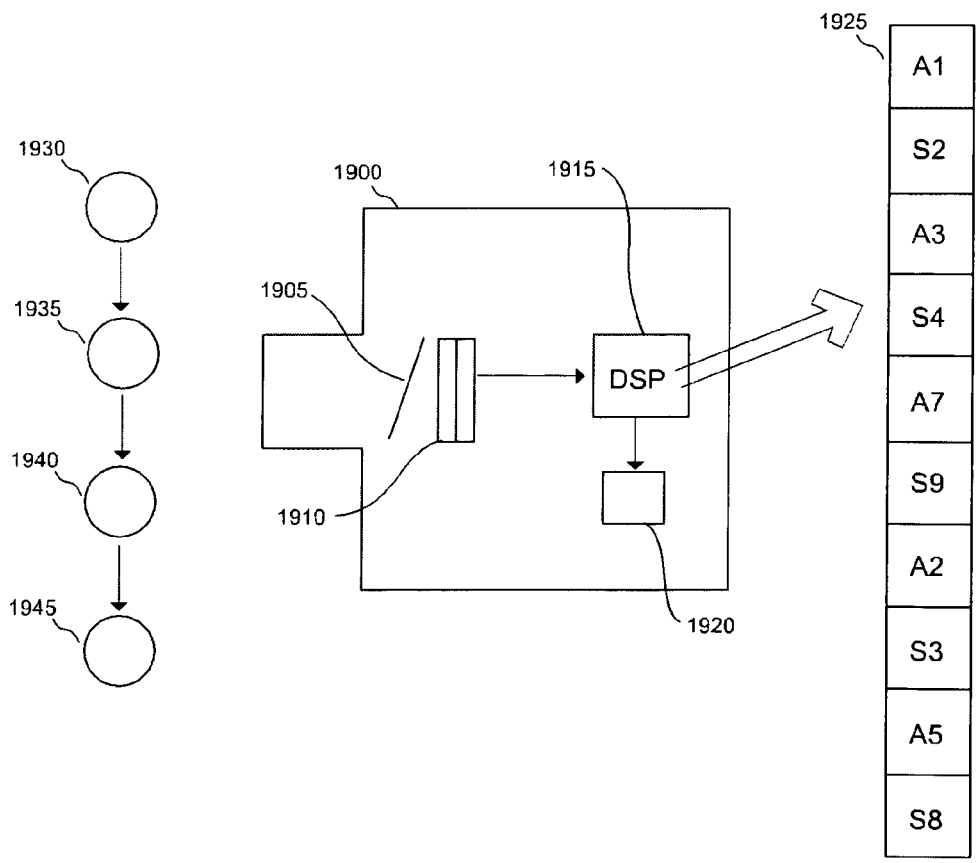
FIG. 19 is a schematic drawing showing the process of analyzing and filtering each frame of a video of a moving object.

FIG. 19 shows the process of analyzing and filtering each frame of a video of a moving object. An object is shown moving from position 1930 to position 1935 to position 1940 to position 1945. The camera (1900), shown with mirror (1905) and sensor (1910) apparatuses, captures the object with image files and sends the files to the DSP (1915) and then to storage (1920). The image files from each frame may require different filtration. The strip on the right (1925) shows the different filtration applied to each frame in sequence. In this example, algorithms A1, S2, A3, S4, A7, S9, A2, S3, A5 and S8 are applied to the different video image frames.

Figure 20:
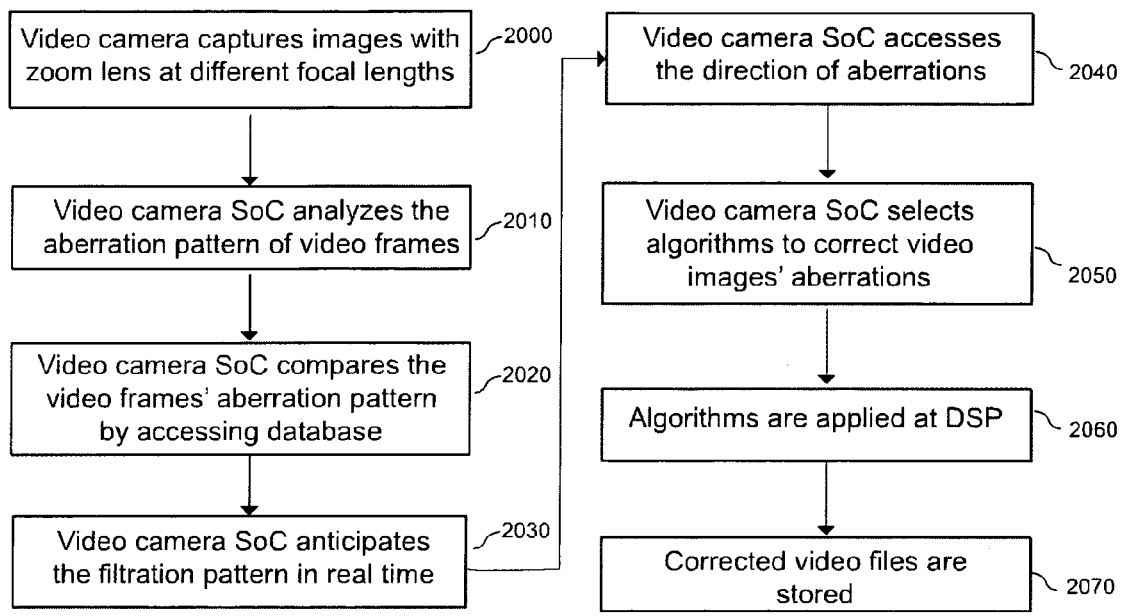
FIG. 20 is a flow chart showing the process of using a camera SoC to filter image aberrations in a video camera.

FIG. 20 shows the process of using a camera SoC to filter image aberrations in a video camera. After the video camera captures images with a zoom lens at different focal lengths (2000), the video camera SoC analyzes the aberration pattern of video frames (2010) and compares the video frames' aberration pattern by accessing a database (2020). The video camera SoC anticipates the filtration pattern in real time (2030) and accesses the direction of aberrations (2040). The video camera SoC selects algorithms to correct video images' aberrations (2050) and applies the algorithms (2060). The corrected video files are then stored (2070).

Figure 21:
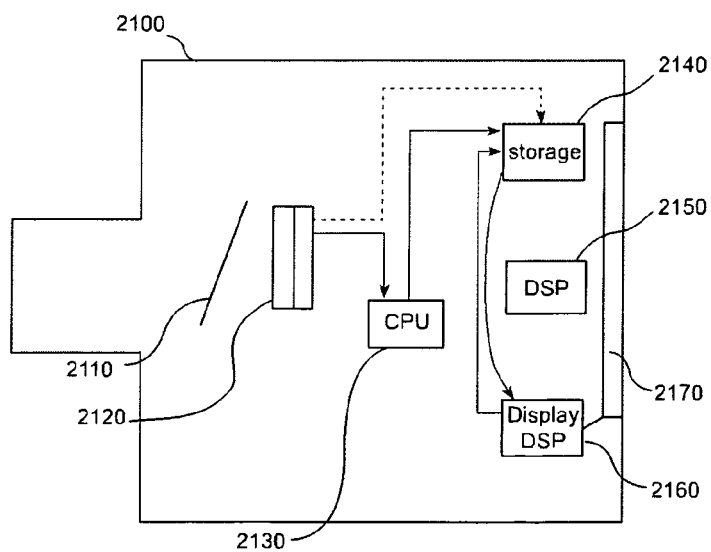
FIG. 21 is a schematic drawing showing the process of using the camera's display circuitry (DSP) to filter images from storage and return the image file to storage.

FIG. 21 shows the process of using the camera's display circuitry (DSP) to filter images from storage and return the image file to storage. The camera (2100), shown with mirror (2110) and sensor (2120) apparatuses sends an image file from the sensor to the CPU (2130). The CPU then sends the file to storage (2140). In one implementation, the image file is sent directly to storage as shown. The image file then bypasses the main camera DSP (2150) and is sent instead to the display DSP (2160) in the display apparatus (2170). Once the display DSP processes the image file, it is returned to storage.

Figure 22:
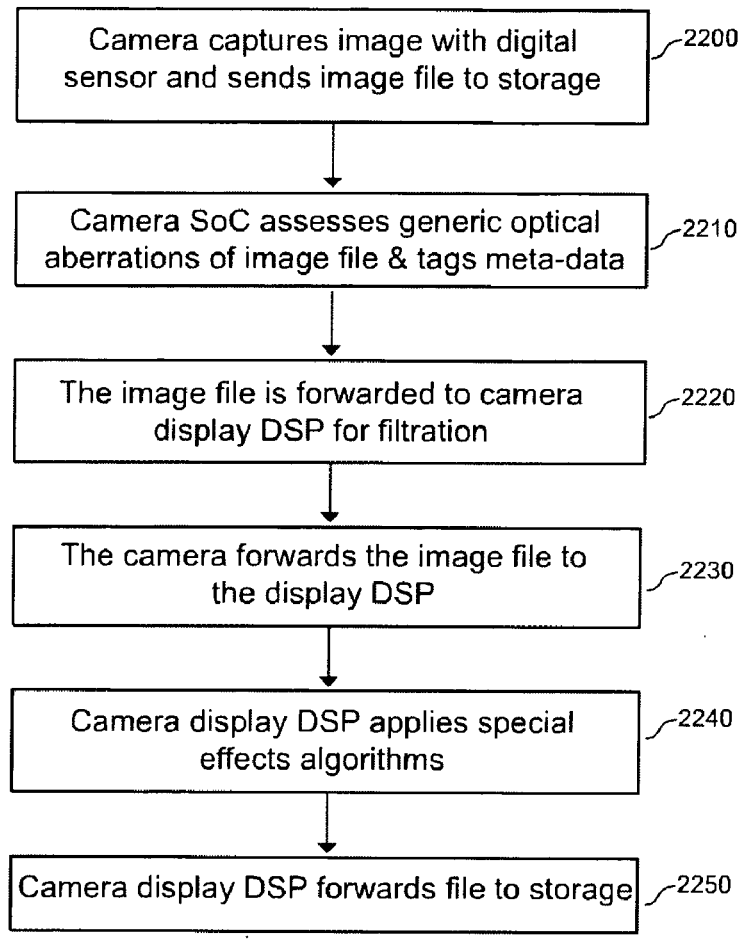
FIG. 22 is a flow chart showing the process of using a camera SoC, the camera DSP and the display circuitry DSP to filter an image file.

FIG. 22 shows the process of using a camera SoC, the camera DSP and the display circuitry DSP to filter an image. After the camera captures an image with a digital sensor and sends the image file to storage (2200), the camera SoC assesses generic optical aberrations of image file and tags meta-data (2210) and filters the image file with the main DSP. The image file is then forwarded to the camera display DSP for filtration (2220). The camera then sends the file to the camera display DSP (2230), which filters the image file by applying an algorithm (2240). In this example, the camera DSP applies special effects algorithms requested by the user preferences. The camera then forwards the file to storage.

Figure 23:
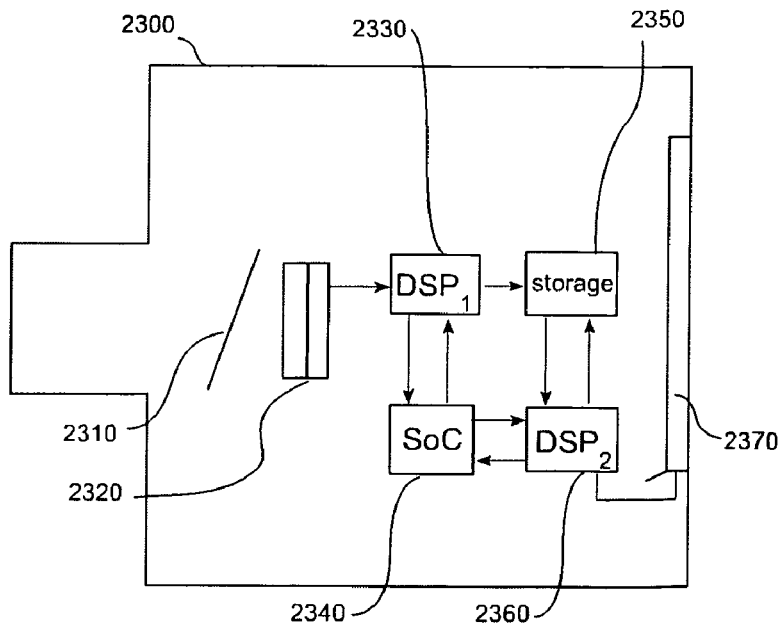
FIG. 23 is a schematic drawing showing the process of using two camera DSPs to simultaneously filter an image file before and after storage.

FIG. 23 shows the process of using two camera DSPs to simultaneously filter an image file before and after storage. The camera (2300) is shown with mirror (2310) and sensor (2320) mechanisms. The sensor captures an image and sends the image file to the DSP 1 (2330), which accesses the SoC (2340) for algorithms. DSP 1 applies a filtration algorithm and sends the image file to storage. The image file is sent from storage to DSP 2 (2360), which accesses the SoC to obtain a filtration algorithm, filters the image file and returns the filtered file to storage. DSP 2 may be in the display (2370) circuitry.

Figure 24:
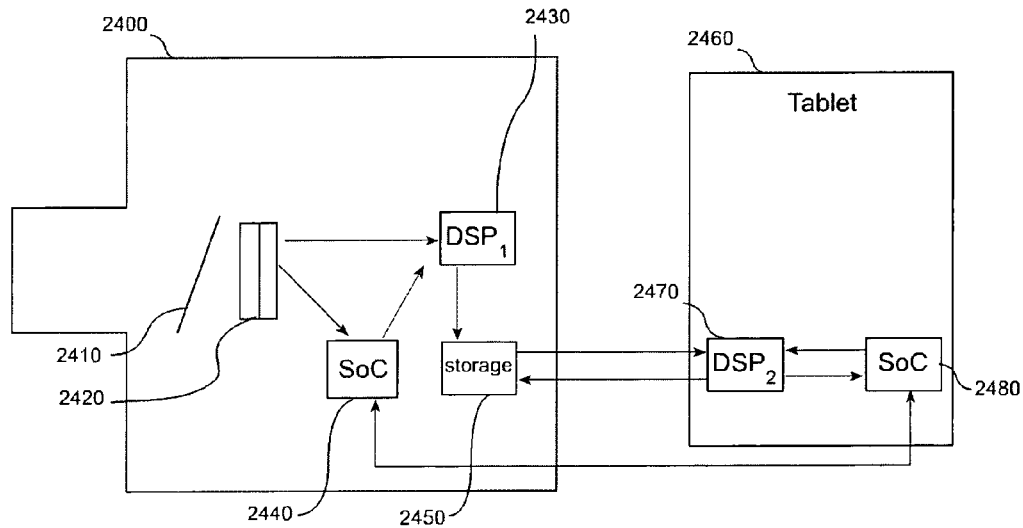
FIG. 24 is a schematic drawing showing the process of using an external computer DSP to supplement camera filtration and sharing camera and computer SoC analyses.

FIG. 24 shows the process of using an external computer DSP to supplement camera filtration and sharing camera and computer SoC analyses. The camera (2400) is shown with mirror (2410) and sensor (2420) mechanisms. The image file is sent from the sensor to the SoC (2440) or directly to the DSP 1 (2430). Algorithms are sent to the DSP 1 from the SoC. Once the camera DSP 1 filters the image, it is sent to storage (2450). The image file is then sent from camera storage to an external computer (2460) DSP 2 (2470). In this example, the computer is a tablet. The DSP 2 accesses the tablet SoC (2480) to obtain filtration algorithms. The camera SoC and the tablet SoC exchange algorithm information. In effect, the camera SoC sends useful filtration programming to the tablet to use the external computation to perform satellite filtration on the image files. Once the image file is filtered in the tablet, it is returned to camera storage.

Figure 25:
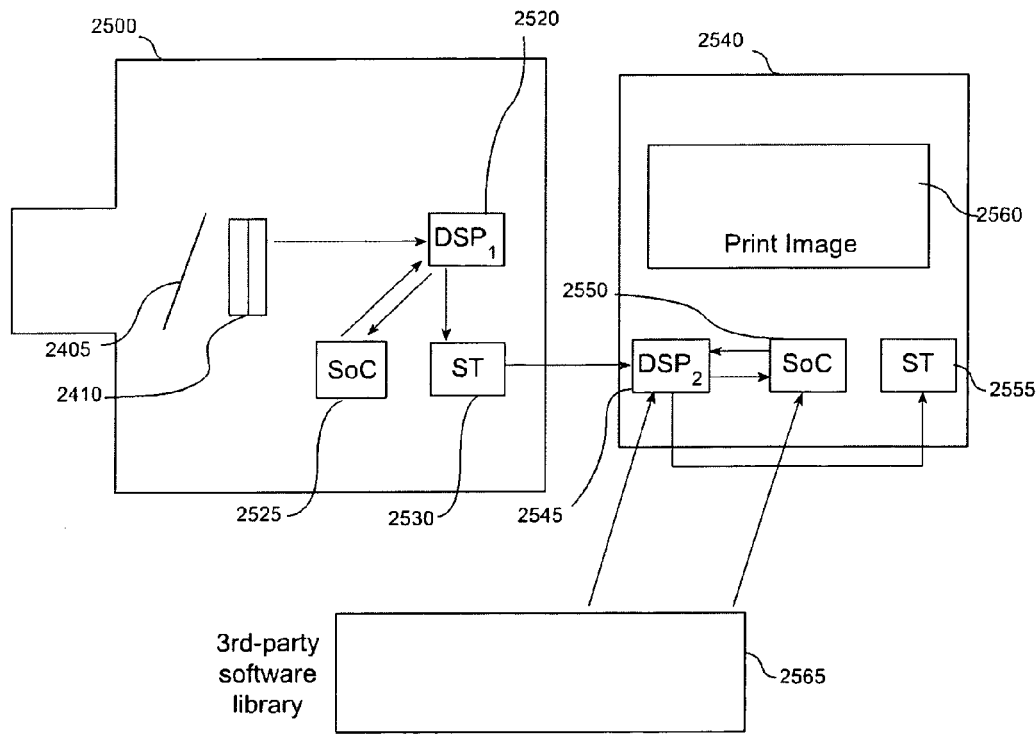
FIG. 25 is a schematic drawing showing the process of sending an image file from a camera to a printer for filtration and printing.

FIG. 25 shows the process of transferring an image file from a camera to a printer. The camera (2500) is shown with mirror (2405) and sensor (2410) apparatuses. The image file is sent from the sensor to the camera DSP 1 (2520). The DSP accesses the camera SoC (2525) to obtain filtration algorithms and applies the algorithms. Once filtered, the image file is sent to the camera storage (2530). The image file is then sent to a printer (2540) DSP 2 (2545), which requests algorithms from the printer SoC (2550). External third party software and algorithms (2565) are downloaded to the printer SoC and the printer DSP. The user filters the image file in the printer. Once the image file is filtered according to user preferences, it is put into the printer storage (2555) and the filtered image file is printed (2560).

Figure 26:
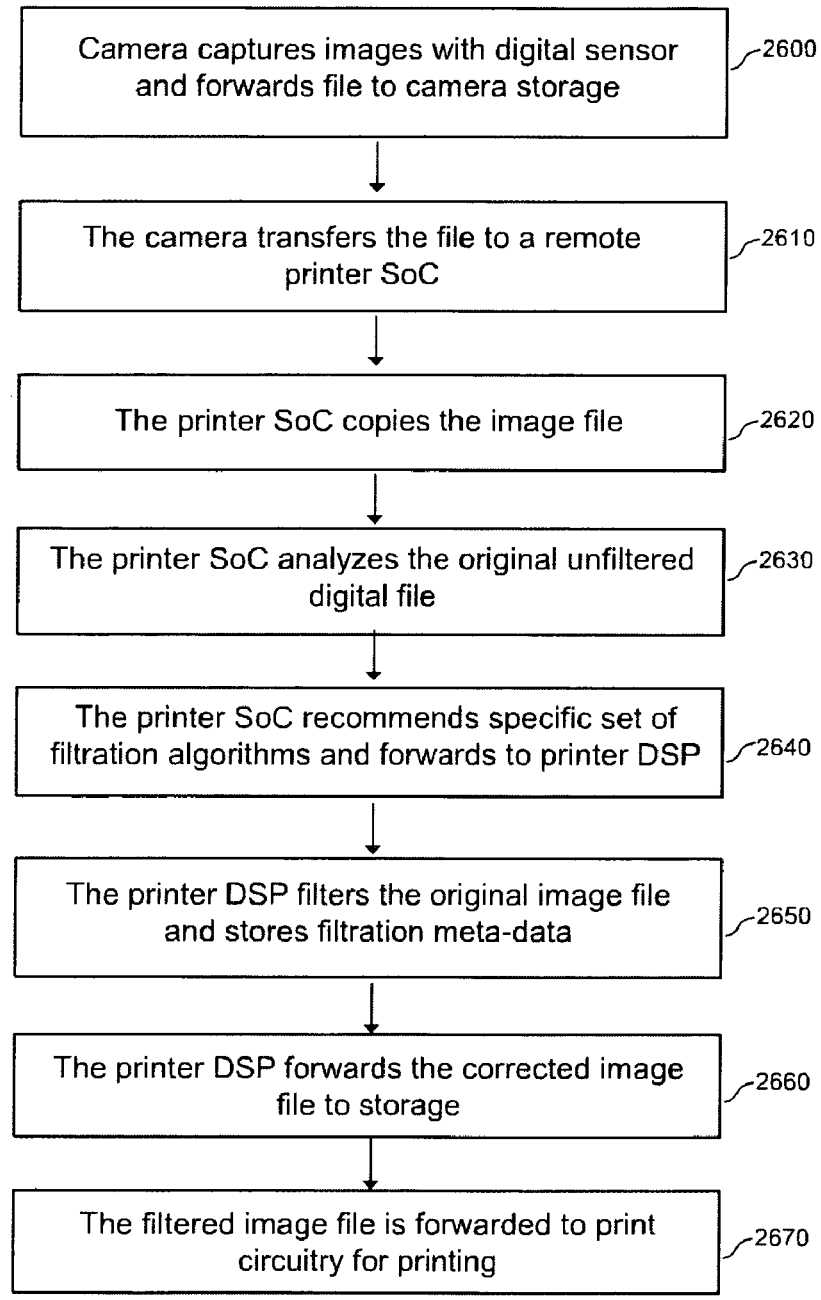
FIG. 26 is a flow chart showing the process of transferring an image file from a camera to a printer.

FIG. 26 shows the process of transferring an image file from a camera to a printer. After the camera captures images with a digital sensor and forwards the file to camera storage (2600), the camera transfers the file to a remote printer SoC (2610). The printer SoC copies the image file (2620) and the printer SoC analyzes the original unfiltered digital file (2630). The printer SoC recommends a specific set of filtration algorithms and forwards them to a printer DSP (2640). The printer DSP filters the original image file and stores filtration meta-data (2650). The printer DSP then forwards the corrected image file to storage (2660) and the filtered image file is forwarded to print circuitry for printing.

I claim:

1. A digital imaging system comprising:
   a digital camera mechanism, an optical lens mechanism, a digital sensor, a CPU, system software, a database management system, at least one digital signal processor (DSP) and a memory storage sub-system;
   the image is captured by an optical lens mechanism, the digital camera mechanism and the digital sensor;
   the system software forwards the image file from the digital sensor to storage;
   wherein the image file is forwarded to the CPU;
   the CPU accesses the database management system to assess specific optical and digital aberrations;
   the database management system compares the optical and digital aberrations to image files in the database;
   the database management system identifies novel optical or digital aberration;
   the CPU constructs at least one algorithm to correct at least one optical or digital aberration by using the database management system to develop an optimized solution to the novel optical or digital aberration;
   the novel optical and digital aberrations and customized filtration solutions are recorded in the database;
   when novel optical or digital aberrations are identified in a subsequent image file, the CPU constructs a novel algorithm to correct the new optical or digital aberrations in the image file within the parameters of prior customized algorithms;
   the CPU sends the digital image file and the at least one customized algorithm to the at least one DSP;
   the at least one DSP applies the at least one customized algorithm to filter the novel optical and/or digital aberrations in the image file; and
   the modified digital file is forwarded to the memory storage sub-system.

2. The system of claim 1:
   wherein the optical aberrations include chromatic aberrations, pin cushioning or vignetting.

3. The system of claim 1:
   wherein the digital aberrations include digital aliasing, moiré, dead pixels or imprecise color rendering of the image.

4. The system of claim 1:
   wherein the camera display circuit contains a DSP used to filter the image file.

5. The system of claim 1:
   wherein the camera CPU accesses a library of algorithms in the database management system to filter different classes of optical and digital aberrations;
   wherein when new optical or digital aberrations are encountered, the database management system is updated; and
   wherein the filtration algorithms are updated to filter the new aberrations.

6. The system of claim 1:
   wherein when at least two algorithms are applied to the image file, the algorithms are applied in sequence.

7. The system of claim 6:
   wherein after at least two algorithms are applied to the image file, the user may remove at least one algorithm filtration effect from the image file by accessing the CPU.

8. The system of claim 1:
   wherein after the initial image file filtration, the custom filtration algorithm is applied to subsequent image files.

9. The system of claim 1:
   wherein the at least one DSP applies a polarization filtration.

10. A digital imaging system comprising:
    a digital camera mechanism, an optical lens mechanism, a digital sensor, a CPU, system software, a database management system, at least one digital signal processor (DSP) and a memory storage sub-system;
    the system software forwards the image file from the digital sensor to the CPU and to storage;
    the image file is forwarded to the CPU;
    the CPU accesses the database management system to retrieve a map of the specific optical or digital aberrations associated with the lens;
    the CPU accesses the database management system to access a map of solutions to optical or digital aberrations in the image file and applies the image filtration solutions by forwarding an algorithm to the at least one DSP;
    the CPU identifies novel optical or digital aberrations by comparing the image file to image files in the database management system;
    the CPU constructs at least one customized algorithm to correct the novel optical and digital aberrations or to provide a customized special effects filtration;
    the CPU stores the at least one customized algorithm in the database;
    the CPU sends the digital image file and the at least one customized algorithm to the at least one DSP to filter the novel optical and digital aberrations in the image file and subsequent image files;
    and
    the CPU forwards the modified digital file to the memory storage sub-system.

11. The system of claim 10:
    wherein the optical aberrations include chromatic aberrations, pin cushioning or vignetting.

12. The system of claim 10:
    wherein the digital aberrations include digital aliasing, moiré, dead pixels or imprecise color rendering of the image.

13. The system of claim 10:
    wherein the camera display circuit contains a DSP used to filter the image file.

14. The system of claim 10:
    wherein the camera CPU accesses a library of software programs to solve different classes of optical and digital aberrations;
    wherein when new optical or digital aberrations are encountered, the aberration map is updated;
    wherein the CPU constructs and applies a novel algorithm solution to the new aberrations; and
    wherein the novel algorithm solution is stored in the database management system.

15. The system of claim 10:
    wherein the at least one DSP applies the at least one algorithm to provide a customized special effects filtration to the image file.

16. The system of claim 10:
    wherein the image file is a video file; and
    wherein the at least one filtration algorithm is applied to at least one image frame in the video file.

17. A method of image filtration which comprises:
    a digital camera mechanism, an optical lens mechanism, a digital sensor, a CPU, system software, a database management system, at least one digital signal processor (DSP) and a memory storage sub-system;

wherein the aberrations from the optical lens mechanism and digital processing are corrected by applying digital filtration by using the CPU, the method consisting of:

capturing the digital image and forwarding the image file from the digital sensor to the camera storage;

forwarding the data from the camera storage to the CPU;

using the CPU to access the database management system to assess novel optical and digital aberrations;

using the CPU to compare the novel optical and digital aberrations to image files in the database;

using the CPU to construct at least one customized algorithm to correct the novel optical and digital aberrations and storing the customized algorithm in the database;

sending the digital image file and the algorithm to the at least one DSP to apply the customized algorithm to modify the novel optical and digital aberrations in the image file and subsequent image files; and forwarding the modified file to the memory storage subsystem.

18. The method of claim 16:

filtering optical aberrations that include chromatic aberrations, pin cushioning or vignetting.

19. The method of claim 16:

filtering digital aberrations that include digital aliasing, moiré, dead pixels or imprecise color rendering of the image.

20. The method of claim 16:

accessing a library of software programs with the CPU to solve different classes of optical and digital aberrations; and updating the software.

* * * * *